United States Patent [19]

Baumgarten et al.

[11] Patent Number: 4,953,417
[45] Date of Patent: Sep. 4, 1990

[54] MECHANICAL GEAR DRIVE

[75] Inventors: Klaus Baumgarten, Eglharting; Kurt Schloeglmann, Taufkirchen, both of Fed. Rep. of Germany

[73] Assignee: Messerschmitt-Boelkow-Blohm GmbH, Munich, Fed. Rep. of Germany

[21] Appl. No.: 323,438

[22] Filed: Mar. 14, 1989

[30] Foreign Application Priority Data

Mar. 22, 1988 [DE] Fed. Rep. of Germany ...... 3809577

[51] Int. Cl.⁵ .............................................. F16H 55/18
[52] U.S. Cl. ...................................... 74/409; 74/440
[58] Field of Search .................................. 74/409, 440

[56] References Cited

U.S. PATENT DOCUMENTS

| | | | |
|---|---|---|---|
| 4,279,173 | 7/1981 | Krebs et al. | 74/409 X |
| 4,433,590 | 2/1984 | Benoit et al. | 74/409 |
| 4,714,388 | 12/1987 | Siler | 74/409 X |
| 4,753,124 | 6/1988 | Chevance | 74/409 X |
| 4,788,878 | 12/1988 | Morota et al. | 74/409 X |
| 4,811,615 | 3/1989 | Rea | 74/409 X |
| 4,827,786 | 5/1989 | Bailey | 74/409 |

FOREIGN PATENT DOCUMENTS 2538460 3/1977 Fed. Rep. of Germany .
2925833 1/1981 Fed. Rep. of Germany .

Primary Examiner—José V. Chen
Attorney, Agent, or Firm—W. G. Fasse; D. H. Kane, Jr.

[57] ABSTRACT

Backlash or play is avoided in a mechanical, self-adjusting gear drive having two sets of gears arranged in parallel to each other by one or more torsion springs effective between a driving shaft and a driven shaft. The gear sets form a closed gear train which contains the prestressed torsion spring (12) at any suitable point. After adjustment of the prestressing, the spring or springs eliminate any backlash throughout the whole gear train.

5 Claims, 4 Drawing Sheets

MECHANICAL GEAR DRIVE

FIELD OF THE INVENTION

The invention relates to a mechanical gear drive, especially a toothed gear wheel drive with several stages arranged between an input driving wheel and an output driven wheel.

BACKGROUND INFORMATION

Mechanical gear drives are known in the most diverse types of constructions. All these gear drives must have a more or less positive or form-locking fit and possess a so-called good "gear stiffness", that is, play or backlash must be avoided. A series of complicated measures have become known hereto, which also lead, to a large extent, to maintenance-free gear drives. However, there is room for improvement with regard to self-adjusting features for avoiding backlash.

OBJECTS OF THE INVENTION

In view of the above it is the aim of the invention to achieve the following objects singly or in combination:
to create a self-adjusting gear drive without any backlash;
to provide a simple gear construction that is nevertheless absolutely free of any play and has a high gear stiffness;
to provide a gear drive that is self-adjusting in response to wear and tear; and
to provide a gear drive completely maintenance-free yet having a high degree of efficiency.

SUMMARY OF THE INVENTION

The foregoing objects have been achieved according to the invention in a mechanical gear drive, comprising a driving input wheel, a driven output wheel, and a plurality of intermediate stage wheels engaged between said driving input wheel and said driven output wheel, said intermediate stage wheels between said driving input wheel and said driven output wheel being arranged in two sets parallel to each other to form a closed gear train, and prestressed torsion spring means operatively connected to at least one point of said closed gear train, and means for adjusting a biasing force of said torsion spring means.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
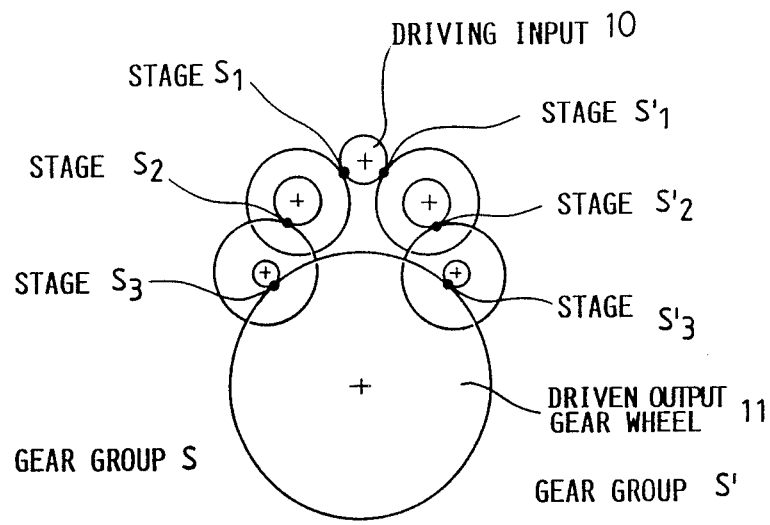
FIG. 1 shows a schematic illustration of the gear drive arrangement of the stages between the driving gear wheel and the driven gear wheel.

The example embodiment of the gear drive shown in FIG. 1 may have n stages. As shown, it has six stages S1, S2, S3, S'1, S'2, S'3 arranged in two groups S, S' arranged in parallel with each other. More specifically, the groups of the gear stages are operatively interposed between the driving input gear wheel 10 and the driven output gear wheel 11. Thus, the stages S1, S2, and S3 are considered to be in parallel to the stages S'1, S'2, and S'3 between the driving gear 10 and the driven gear 11 to form a closed gear train.

In order to avoid any backlash or play this closed gear train construction comprises at least one sufficiently prestressed torsion spring element 12 inserted at one or several points in the gear train, so that backlash or play is eliminated throughout the entire gear train. Additionally, only one tooth flank of the two flanks of each tooth has contact during meshing and the tooth flanks do not lift off even at maximum torque load during operation. To achieve this, the spring prestressing torque must be greater than the maximum operating torque at which the gear unit must still run without backlash or play.

The above mentioned torsion spring element 12 can be integrated in the driving gear, in the driven gear, between two stages of the gear stage group S, or between two stages of the gear stage group S', and/or in several or in any one of the single stages S1 to S'3.

The torsion spring element 12 can, for example, act on one single point, or several springs can be distributed throughout the whole gear train. In an alternative embodiment the gear train itself can be constructed to be torsionally elastic.

There are two ways to set or adjust the prestressing. In one embodiment the prestressing can be adjusted at any point in the gear drive by an adjustment device capable of twisting the torsion spring element 12 which is effective in a completely assembled gear drive. In another embodiment the torsion spring element 12 can be prestressed during the assembling of the gear drive.

If only a single torsion spring element 12 is used and if this spring element shall be subjected only to a small load, then the torsion spring element has to be placed at a point where only small operational torques occur. In the example embodiment shown in FIG. 1, this would apply, for example, to the driving input gear or shaft 10.

The principle described here can also be applied to all other form-locking or positive fit types of gears to eliminate backlash and to attain a higher gear stiffness.

Additional possible combinations of arranging the torsion spring 12 and the torque adjusting device 13 are shown below.

| Example | Spring On | Adjustment On |
| --- | --- | --- |
| 1. (FIG. 2) | driving shaft | driving shaft |
| 2. (FIG. 3) | driving shaft | follower shaft |
| 3. | driving shaft | driven shaft |

-continued

| Example | Spring On | Adjustment On |
| --- | --- | --- |
| 4. (FIG. 4) | follower shaft | driving shaft |
| 5. | follower shaft | follower shaft |
| 6. (FIG. 5) | follower shaft | other follower shaft |
| 7. | follower shaft | driven shaft |
| 8. | driven shaft | driving shaft |
| 9. | driven shaft | follower shaft |
| 10. | driven shaft | driven shaft |

The rotor of the motor 31 is rigidly secured to the shaft 25 which is hollow. The end of the shaft 25 facing the gear is constructed as a pinion. The torsion element 23 is pivoted to the shaft 25 through the nut 24. The torsion element 23 is further connected with the adjustment element 22 and through the pin 30 with the nut 21, the shaft 26, and the pinion 28. A rotation of the adjustment element 22 causes a biasing of the torsion spring 23, thereby causing freedom from play between the parallel gear stages 29 and 27 and all other gear members. The pin 30 secures the bias.

Figure 2:
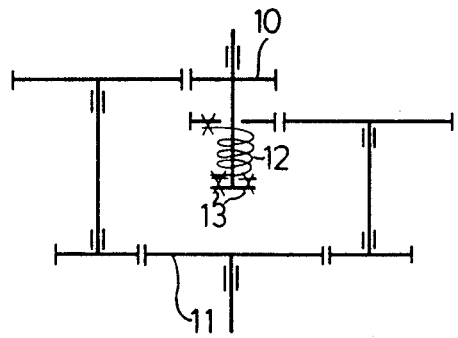
FIG. 2 shows a basic gear drive arrangement according to FIG. 1 illustrating a combination of a spring arrangement and an adjusting device, each acting on the driving shaft.
Figure 3:
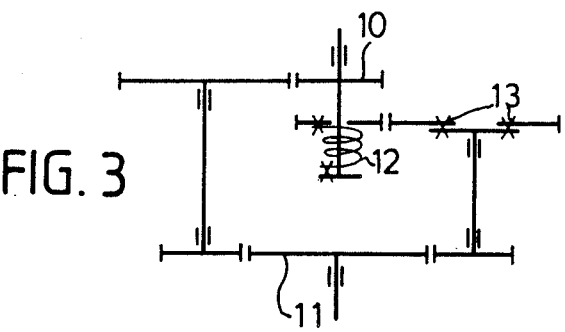
FIG. 3 shows a basic gear drive arrangement similar to FIG. 2, wherein, however, the spring arrangement acts on the driving shaft and the adjusting device acts on the follower or driven shaft.
Figure 4:
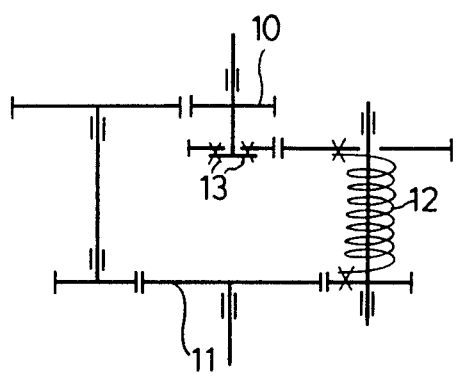
FIG. 4 shows a basic gear drive arrangement similar to FIG. 2, wherein, however, the spring arrangement acts on the driven shaft and the adjusting device acts on the driving shaft.
Figure 5:
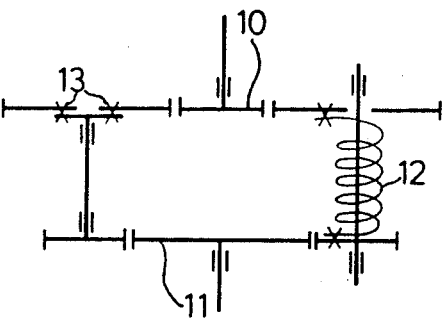
FIG. 5 shows a basic gear drive arrangement similar to FIG. 2, wherein the spring arrangement acts on the follower or driven shaft and the adjusting device acts on another follower or driven shaft.

FIGS. 2 and 3 show the arrangement of the torsion spring 12 near or close to the driving input wheel 10. FIGS. 4 and 5 show the arrangement of the torsion spring 12 near or close to the driven output wheel 11. In both instances the adjusting device 13 can be positioned near the spring 12 as shown in FIG. 2 or the adjusting device 13 can be positioned away from the spring 12 as shown in FIGs. 3, 4, and 5, whereby the above listed combinations are possible. Each or any one of the wheels in the intermediate stages S1, S2, S3, S'1, S'2, S'3, and the input wheel 10, and the output wheel 11 may be provided with a torsion spring. Similarly, each or any one of the just listed members of the closed gear drive train may be constructed with an adjusting device 13 for adjusting a prestressing biasing force of the torsion spring 12.

Figure 6:
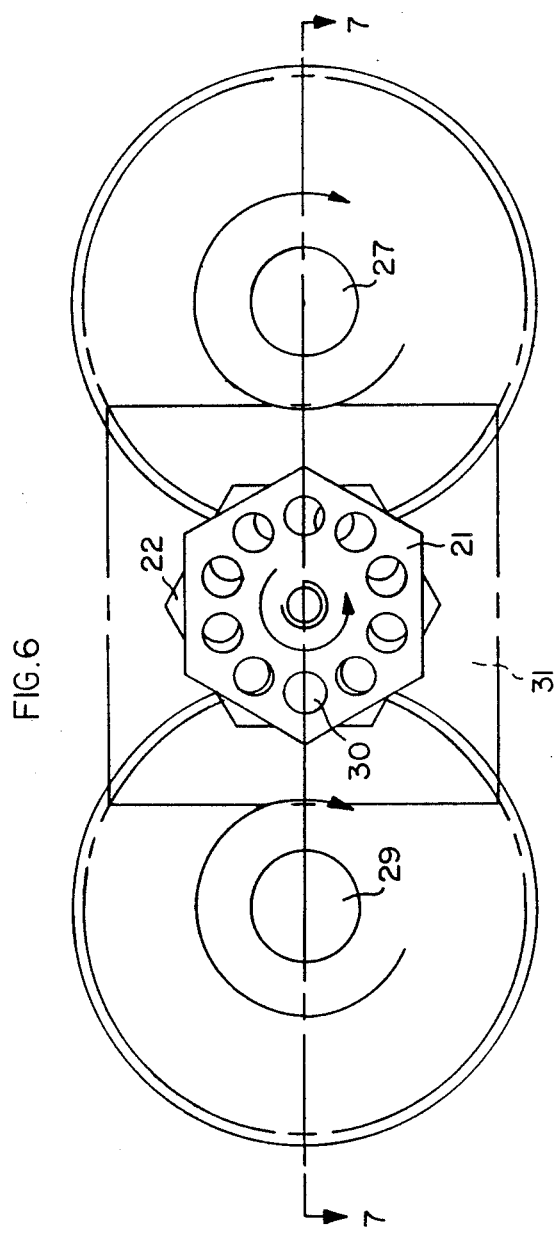
FIG. 6 is a view in the direction of the arrow A of one possible practical embodiment of a gear stage according to the invention.
Figure 7:
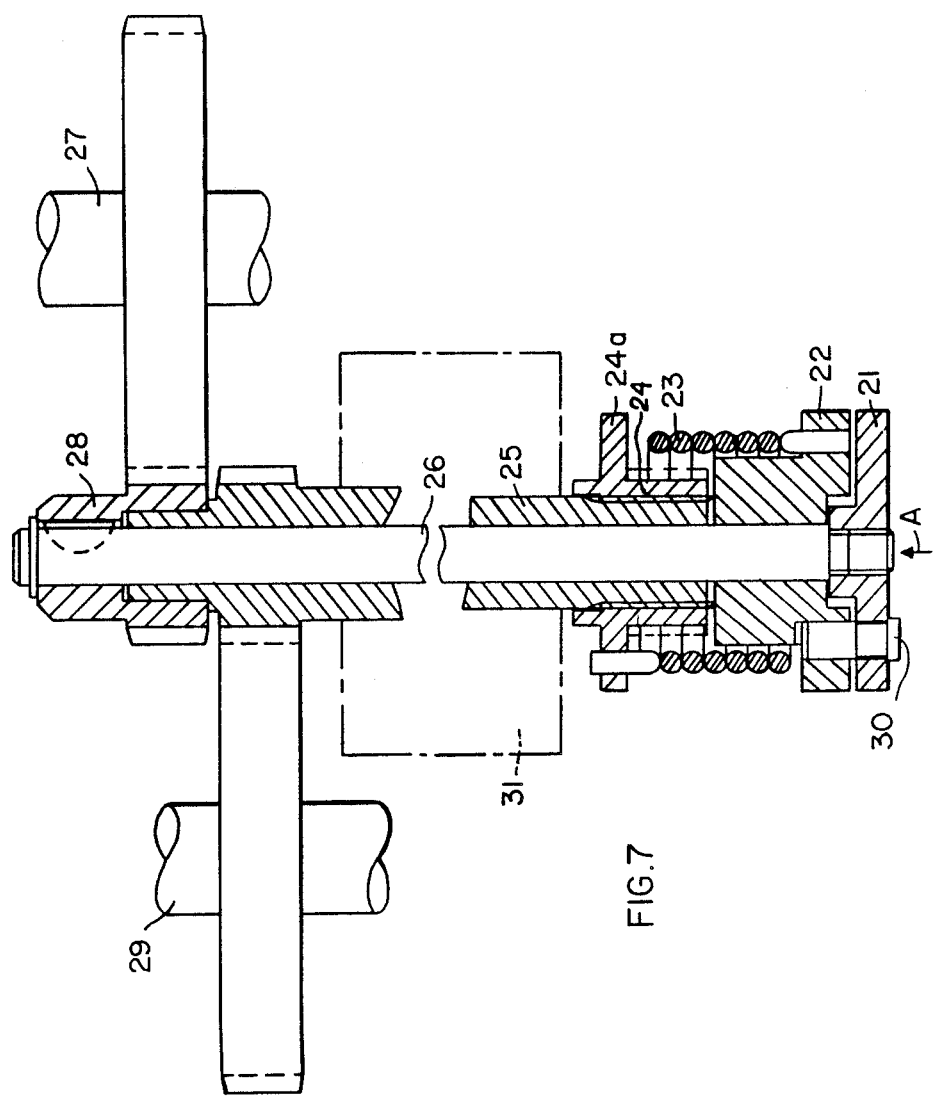
FIG. 7 is a sectional view along section line 7—7 in FIg. 6.

FIGS. 6 and 7 show a practical embodiment of a gear stage according to the invention. A rotor of a motor 31, shown by dashed lines, is rigidly secured to a hollow outer shaft 25. Near one end the shaft 25 carries a pinion 25a meshing with a gear wheel 33 on a shaft 29. Near its other end the shaft 35 carries a threaded nut 24 with a shoulder flange 24a. An inner shaft 26 passes through the hollow shaft 25. A pinion 28 is rigidly secured to one end of the inner shaft 26. The pinion 28 meshes with a gear wheel 32 on a shaft 27. The inner shaft 26 is coupled to the outer shaft 25 through a torsion element or torque spring 23 having one end 23a anchored in the flange 24a, whereby the spring 23 is rigidly connected to the outer shaft 25. The other end 23b of the spring 23 is rigidly secured to an adjustment member 22 rotatably held on the other end of the inner shaft 26. A nut 21 with through holes 21a is secured to a threaded end 26a of the shaft 26. A locking pin 30 is insertable through any one of the holes 21a and into respective holes 22a in the adjustment member 22. When the pin 30 is withdrawn, the adjustment member 22 can be rotated relative to the nut 21 as indicated by the arrow 34 for adjusting the torque moment of the spring 23, whereupon the locking pin is again inserted through the nut 21 and into the element 22. The torque moment or bias of the spring 23 is such that play is eliminated between the parallel gear stages 27, 32; 29, 33 and all other gear members. The gear wheels 32 and 33 rotate, for example, clockwise as shown by the arrows 36 and 35 if the shafts 25, 26 rotate counterclockwise.

Although the invention has been described with reference to specific example embodiments it will be appreciated that it is intended to cover all modifications and equivalents within the scope of the appended claims.

What we claim is:

1. A mechanical closed gear drive train, comprising a driving input wheel (10), a driven output wheel (11), and a plurality of intermediate stage wheels engaged between said driving input wheel (10) and said driven output wheel, said intermediate stage wheels between said driving input wheel (10) and said driven output wheel (11) being arranged in two sets parallel to each other to form said closed gear drive train, prestressed torsion spring means (12) directly connected in at least one location anywhere in said closed gear drive train (S1 to S'3), and means (13) for adjusting a biasing force of said torsion spring means (12), said adjusting means being located anywhere in said closed gear drive train, said adjusting means being adjusted so that a respective spring prestressing torque is greater than a maximum torque at which said gear drive should still run without backlash or play, for eliminating any backlash and avoiding any play between said driving input wheel and said driven output wheel, said biasing force being constantly effective for self-adjusting said closed gear drive train.

2. The gear drive of claim 1, wherein said torsion spring means (12) is arranged in said closed gear drive train close to said driving input wheel (10).

3. The gear drive of claim 1, wherein said torsion spring means (12) is arranged in said closed gear drive train close to said driven output wheel (11).

4. The gear drive of claim 1, wherein said torque spring means comprise a torsion spring element for any one member of said closed gear drive train to make said member of said closed gear drive train torsion elastic.

5. The gear drive of claim 1, wherein any one member of said closed gear drive train is constructed for adjusting a prestressing biasing force of said torsion spring means.

* * * * *